(12) United States Patent
Krijn et al.

(10) Patent No.: US 9,946,055 B2
(45) Date of Patent: Apr. 17, 2018

(54) BEAM SHAPING SYSTEM AND AN ILLUMINATION SYSTEM USING THE SAME

(71) Applicant: PHILIPS LIGHTING HOLDING B.V., Eindhoven (NL)

(72) Inventors: Marcellinus Petrus Carolus Michael Krijn, Eindhoven (NL); Ruslan Akhmedovich Sepkhanov, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 54 days.

(21) Appl. No.: 15/121,651

(22) PCT Filed: Mar. 4, 2015

(86) PCT No.: PCT/EP2015/054478
§ 371 (c)(1),
(2) Date: Aug. 25, 2016

(87) PCT Pub. No.: WO2015/132290
PCT Pub. Date: Sep. 11, 2015

(65) Prior Publication Data
US 2016/0363747 A1   Dec. 15, 2016

(30) Foreign Application Priority Data
Mar. 4, 2014 (EP) ..................... 14157679

(51) Int. Cl.
F21V 1/00 (2006.01)
G02B 19/00 (2006.01)
(Continued)

(52) U.S. Cl.
CPC .......... G02B 19/0028 (2013.01); F21V 5/007 (2013.01); F21V 5/045 (2013.01);
(Continued)

(58) Field of Classification Search
CPC ......... F21V 5/007; F21V 5/045; G02B 5/045; G02B 3/08; G02B 3/0056
See application file for complete search history.

(56) References Cited

U.S. PATENT DOCUMENTS 7,150,522 B2   12/2006   Sen
2007/0091444 A1   4/2007   Kim et al.
(Continued)

FOREIGN PATENT DOCUMENTS

EP   2343578A1 A1   7/2011
JP   2002352611A1 A   12/2002
(Continued)

Primary Examiner — Sean Gramling

(57) ABSTRACT

A beam shaping system is for example for use over an array of light sources. An array of beam shaping units is arranged in a general plane, each beam shaping unit comprising a central refracting area, an intermediate total internal reflection area for processing of light from a light source beneath the central area, and an outer total internal reflection area for processing light from the nearest light source and an adjacent light source. This outer area essentially extends the useful size of the adjacent beam shaping unit to improve the beam shaping performance and/or the optical efficiency.

15 Claims, 8 Drawing Sheets

(51) Int. Cl.
   *G02B 5/04* (2006.01)
   *F21V 5/00* (2018.01)
   *F21V 5/04* (2006.01)
   *G02B 3/00* (2006.01)
   *G02B 3/08* (2006.01)
   *F21V 7/00* (2006.01)
   *F21Y 105/10* (2016.01)
   *F21Y 115/10* (2016.01)
   *F21Y 105/18* (2016.01)

(52) U.S. Cl.
   CPC .......... *F21V 7/0091* (2013.01); *G02B 3/0056* (2013.01); *G02B 3/08* (2013.01); *G02B 5/045* (2013.01); *G02B 19/0066* (2013.01); *F21Y 2105/10* (2016.08); *F21Y 2105/18* (2016.08); *F21Y 2115/10* (2016.08)

(56) References Cited

U.S. PATENT DOCUMENTS

| | | | |
|---|---|---|---|
| 2007/0147041 A1* | 6/2007 | Shiratsuchi | F21V 5/007 362/268 |
| 2013/0010454 A1* | 1/2013 | Takayama | F21V 5/045 362/84 |
| 2013/0051029 A1 | 2/2013 | Suzuki et al. | |
| 2014/0204592 A1* | 7/2014 | Miyashita | F21S 48/115 362/311.06 |

FOREIGN PATENT DOCUMENTS

| | | |
|---|---|---|
| JP | 2013057874 A | 3/2013 |
| WO | WO2008102339 A1 | 8/2008 |
| WO | WO201356928 A1 | 4/2013 |

* cited by examiner $$n = \sin(\theta - \alpha)/\sin\theta_2$$
$$\theta_2 = \sin^{-1}\{(\theta - \alpha)/n\} \quad \ldots [1]$$

$$/2 + \alpha + 2\alpha + \theta_2 - /2 =$$
$$3\alpha - + \theta_2 = 0 \quad \ldots [2]$$

BEAM SHAPING SYSTEM AND AN ILLUMINATION SYSTEM USING THE SAME

CROSS-REFERENCE TO PRIOR APPLICATIONS

This application is the U.S. National Phase application under 35 U.S.C. § 371 of International Application No. PCT/EP2015/054478, filed on Mar. 4, 2015, which claims the benefit of European Patent Application No. 14157679.3, filed on Mar. 4, 2014. These applications are hereby incorporated by reference herein.

FIELD OF THE INVENTION

This invention relates to beam shaping optics for illumination systems and to illumination systems using the beam shaping optics.

BACKGROUND OF THE INVENTION

Beam shaping is essential in many lighting applications. Examples of beam shaping optical elements include classical elements such as reflectors and collimators. Such optical elements occupy a rather large volume and are relatively expensive, especially when an array of such optics is needed, as is often the case for spot lighting applications.

Beam shaping is generally used to reshape the output light profile of LEDs, because they have a very small and bright light output area, whereas a larger light output area is desired by users.

For LED spot lighting applications, the light emitted by an LED has to be collected and collimated to a certain degree. The degree of collimation depends on the application, but typically varies from 40° for a wide beam to 10° for a narrow beam.

For the collection and collimation functions, total internal reflection (TIR) collimators are typically used. They use a combination of refraction at a central part of the collimator and total-internal-reflection at the outer part of the collimator. Such collimators are relatively bulky and expensive.

The use of thin film micro-optics is being investigated widely as an alternative option for providing the same functionality as TIR collimators. These take the form of a slab of material which has microstructured surfaces on one or both surfaces.

For most applications, a single LED does not provide enough light. In that case, an array of LEDs is used, each with its own collimator. When using conventional optics, this option is not only costly but also, from a customer perspective, results in a shower-head impression when looking towards or into the light source. This shower-head impression is not appreciated from an aesthetic point of view.

The tiling of thin-film micro-optics does not have these drawbacks, in that the tiled structure has a generally planar appearance. However, there remain difficulties in achieving a small beam spread in combination with a high optical efficiency.

The invention aims to address this issue.

JP2002352611A discloses a display device comprising an array of beam shaping units arranged in a general plane, each beam shaping unit comprising a central refractive area S and one outer area M providing TIR.

SUMMARY OF THE INVENTION

The invention is defined by the claims.

According to an aspect there is provided a beam shaping system comprising an array of beam shaping units arranged in a general plane, each beam shaping unit comprising:

a central area for providing a beam passing function by refracting light from a light source beneath the central area;

an intermediate area for providing a beam shaping function by providing total internal reflection (TIR) of light from the light source beneath the central area; and an outer area for providing a beam shaping function by providing total internal reflection (TIR) of light from the light source beneath the central area and also providing total internal reflection of light from a light source beneath the central area of an adjacent beam shaping unit, and each beam shaping unit having a contoured surface for facing an array of light sources, wherein the contoured surface in the intermediate area and the outer area comprises a set of light deflecting prismatic elements (teeth), each having a first face for facing towards the light source and a second face for facing away from the light source, wherein the first face extends from the general plane at a first angle $\alpha$ and the second face extends from the general plane at a second angle $\beta$, wherein for the teeth in the intermediate area $\alpha < 85°$, $\beta > 50°$, $|\alpha - \beta| 5°$, wherein for the teeth in the outer area $50° < \alpha$, $\beta < 60°$ and $|\alpha - \beta| < 5°$.

The beam shaping system can be used to process light from an array of light sources, for example to form a beam with a limited beam spread. The beam shaping units are designed to be centered above a respective light source. Preferably, the central area, the intermediate area and the outer area are concentrically arranged around a center with the associated light source beneath the center. The outer area provides an overlap region between neighboring beam shaping units (and therefore neighboring light sources). This overlap region allows the acceptance and shaping of light from neighboring light sources reaching this overlap region. The result is an increase in the optical efficiency or an increase in the degree of beam shaping (e.g. collimation) or a combination of both.

The system can comprise a plate or foil (extending in the general plane) provided with the beam shaping units having a contoured surface for facing the array of light sources, wherein the contoured surface in the intermediate area and the outer area comprises a set of teeth, each having a first face for facing towards the light source and a second face for facing away from the light source. The teeth receive relatively large angle incident light (i.e. close to the general plane). The first face generally performs refraction of the incident light (which is an air-to-plate boundary), whereas the light reflects off the second face by total internal reflection (at a plate-to-air boundary).

The material of the plate or the foil preferably has a refractive index in the range 1.4 to 1.7.

The first face can be defined as extending from the general plane at a first angle $\alpha$ and the second face can be defined as extending from the general plane at a second angle $\beta$. For the teeth in the outer area $\alpha$ and $\beta$ can lie within the range 50° to 60°.

The teeth are in this way quite symmetric so that they can process light from opposite sides in a similar way. The symmetry can be such that $|\alpha - \beta| < 5°$. In one perfectly symmetric implementation $\alpha = \beta$.

Each beam shaping unit can have a hexagonal outer shape, the boundary between the central area and the intermediate area is circular, hexagonal or hexagonal with rounded corners, and the boundary between the intermediate area and the outer area is circular, hexagonal or hexagonal with rounded corners. The teeth can thus extend circularly around the center, apart from in the outer region, where the outermost shape is hexagonal. The outer teeth can then be shaped to blend from a circular shape to a hexagonal shape, or they may be discontinuous circular portions. Alternatively, the teeth may all follow hexagonal paths and the boundaries can then be considered to be hexagonal or having a between that a circle and a hexagon.

Thus, each beam shaping unit resembles a Fresnel structure and the total internal reflection teeth may have a shape that is not exactly rotationally symmetric but instead a shape that is somewhere in between that of a circle and a hexagon. The inner areas may for example be more circularly symmetric than the outer areas. Circularly symmetric structures are preferable because they are easier to fabricate.

In embodiments the beam shaping unit comprises at least one of the following preferred features:

a relatively large, curved central light deflecting element surrounded by slightly tilted, light deflecting prismatic elements (teeth), slightly tilted in this respect means that $\alpha>80°$ and $\beta<50°$, wherein preferably $\alpha-\beta>35°$;

for teeth in the intermediate area $\alpha>\beta$, preferably $\alpha-\beta<30°$;

for teeth in the outer area $\alpha=\beta$.

The beam shaping function of the intermediate area and of the outer area is preferably a collimation function. Similarly, the beam passing function provided by the central area can also include a collimation function. Thus, a single plate can provide collimation across its full area. In dependence on the desired degree of collimation, the beam shaping unit comprises one or more of the abovementioned preferred features.

An alternative is to use different structures for collimating the central area directly over the light source, and for collimating the peripheral areas (including where the collimation is performed for adjacent light sources). For this purpose, a second array of second beam shaping units can be arranged in a general plane over said (first) array of beam shaping units, wherein the beam passing function provided by the central area of said (first) array of beam shaping units provides a pass through function.

The invention also provides an illumination system, comprising:

an array of light sources; and a beam shaping system of the invention, wherein the central area of each beam shaping unit is provided over a respective light source.

The light sources can comprise LEDs, for example together comprising a spot light illumination system.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a beam shaping system for example for use over an array of light sources. An array of beam shaping units is arranged in a general plane, each beam shaping unit comprising a central refracting area, an intermediate total internal reflection area for processing of light from a light source beneath the central area, and an outer total internal reflection area for processing light from the nearest light source and an adjacent light source. This outer area essentially extends the useful size of the adjacent beam shaping unit to improve the beam shaping performance and/or the optical efficiency.

As described above, there is the problem that when using thin-film micro-optics for beam collimation (or other beam shaping functions), it is difficult to achieve a small beam spread in combination with a high optical efficiency. The origin of this problem will first be described.

Figure 1:
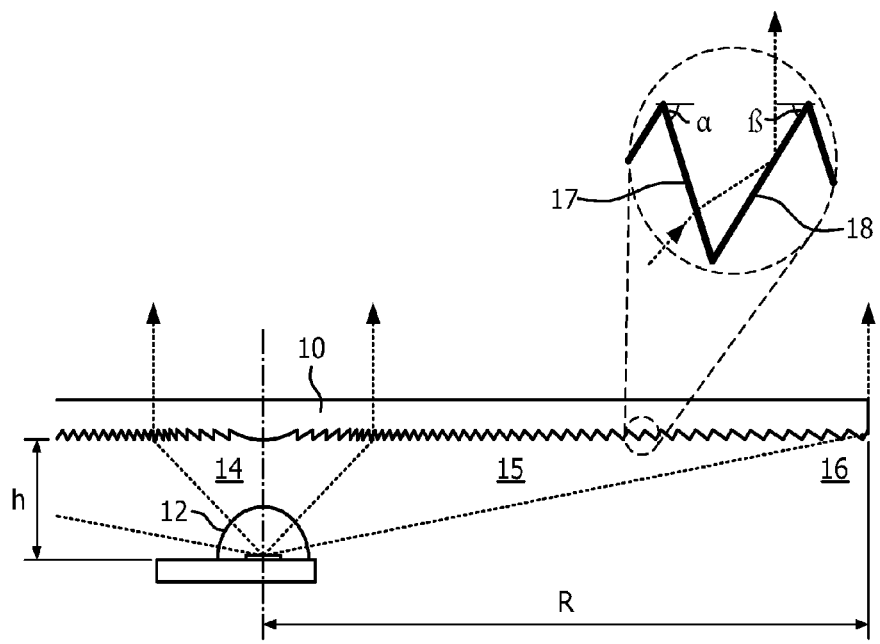
FIG. 1 shows a system proposed by the applicant of a beam shaping unit and associated LED.

FIG. 1 schematically shows the principle of operation by means of a cross sectional view of a part of a beam shaping unit 10 embodied as a thin-film micro-optic plate/foil 10 for collimating the light emitted by an LED 12. The thin-film micro optic plate/foil (also referred to as "optical element") is located close to the LED (at a distance of a few mm). The light emitted by an LED typically has a Lambertian distribution. The angles of the light rays emitted by the LED range from perpendicular to the optical element to parallel to the optical element (the rays subtend a solid angle of $2\pi$).

The central part 14 relies on refraction and is basically in the form of a Fresnel lens, i.e. it comprises a relatively large, curved central light deflecting element surrounded by slightly tilted, light deflecting prismatic elements. Slightly tilted in this respect means that $\alpha>80°$ and $\beta<50°$, wherein preferably $\alpha-\beta>35°$. Rays leaving the LED at large angles with respect to a direction normal to the optical element cannot be collimated by means of refraction. Thereto an intermediate part 15 and an outer part 16 of the optical element rely on total-internal-reflection (TIR). In these areas, each ray interacts with the lower surface of the optical element twice as shown in the enlarged portion of the FIG. 1.

As an example the interaction of a light ray with a light deflecting prismatic element in the intermediate area 15 is shown, for the shown prismatic element α=70° and β=55°. The first time the light ray is refracted by a first surface 17 (passing from air to the optical plate), and the second time it is reflected from a second surface 18 by total internal reflection (at the plate to air boundary). In this way rays can be collimated leaving the LED at large angles.

Figure 2:
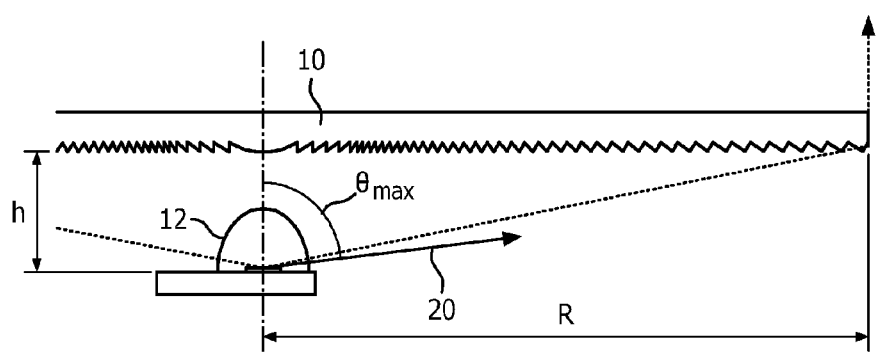
FIG. 2 shows how some light from the LED of FIG. 1 is directed to an adjacent beam shaping unit when an array of LEDs is used.

FIG. 2 shows the same structure as FIG. 1 and shows that rays 20 leaving the LED at too large an angle will miss the optical element altogether. The maximum angle for which a ray will be intercepted is $\theta_{max}=\tan^{-1}(R/h)$, where R is the radius of the optical element and h is the distance from the LED to the optical element. For a Lambertian emitter, the fraction f of the light rays (or energy) intercepted this way is $f=\sin(\theta_{max})^2$.

The fraction of the energy intercepted can be maximized by minimizing the distance h or maximizing the radius R.

In practice, there are limits to maximizing R: a certain number of LEDs has to be accommodated in the limited space available. Furthermore, for cost reasons, there is a trend away from high-power LEDs towards mid-power LEDs, implying that the space available for each LED will be reduced further.

There are also limits to minimizing h.

Figure 3:
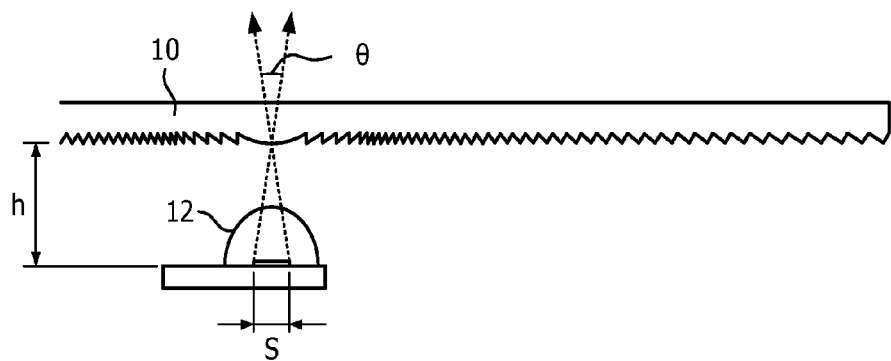
FIG. 3 shows the design parameters which influence the optical performance of the system.

FIG. 3 shows the same structure as FIG. 1 and is used to explain the significance of the size of the LED source. As shown in FIG. 3, the degree of collimation (beam spread) obtained from the combination of an LED and a thin-film optical element is determined by the distance h and the source size s (the size of the LED die). Typically, the beam spread Δθ is given by the expression $\Delta\theta=\tan^{-1}(n.s/h)$, where n is the index of refraction of the dome of the LED (n=1 in case there is no dome). This means that a small distance from LED to optical element implies a large beam spread.

This means a trade-off has to be made between beam spread and optical losses.

Figure 4:
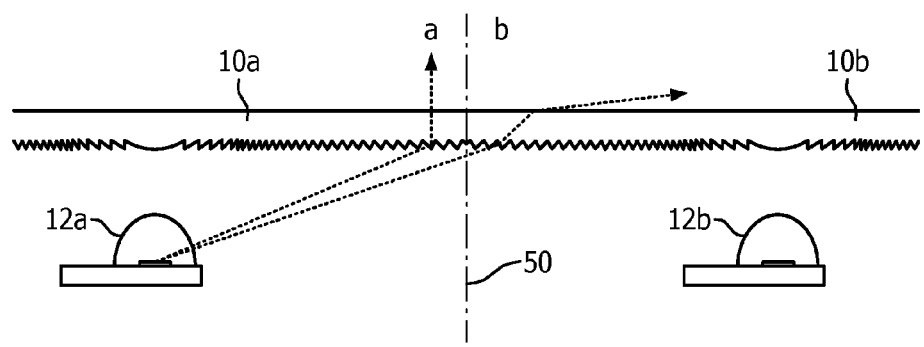
FIG. 4 shows the problem of light from one LED reaching an adjacent beam shaping unit.

FIG. 4 shows the situation when there is an array of LEDs 12a, 12b, each with its optical element 10a, 10b, stacked in a close packing configuration. For example, each LED can be provided with a hexagonal optical element, and the optical elements can then be tessellated. Tessellation can also be done by congruently shaped optical elements having, for example, a triangular, rectangular or square, optionally with sharp or rounded corners, or a circular circumference as a boundary.

The light rays originating from an LED 12a that will miss the optical element 10a associated with this LED (ray b in FIG. 4) will cross-over to the neighboring optical element 10b and will end up with an outgoing angle that is uncontrolled and likely to be too large for the application in mind. In other words, these rays will end up outside the desired beam and lead to a reduced optical efficiency. This optical efficiency can be defined as the fraction of the rays that end up within the desired target beam.

The invention provides a design in which an array of thin-film micro-optical elements is provided. Each optical element is for alignment with a corresponding light source. The array of optical elements forms a single sheet, although multiple sheets can also be used.

Each optical element is divided into three regions. Rays crossing the center region are collimated by the principle of refraction. Rays crossing a region in between the center region and the outer region are collimated by TIR. The TIR micro-structures (which have the structure of prismatic elements or teeth) are substantially asymmetric.

An outer region also relies on TIR and has structures that can either be substantially symmetric or else these can be asymmetric. However, the angles of the TIR teeth in this outer region are chosen such that the rays from the corresponding LED and the rays from the neighboring LED are collimated (or otherwise shaped), i.e. α and β are practically equal, i.e. |α−β|<5° or even equal α=β.

Figure 5:
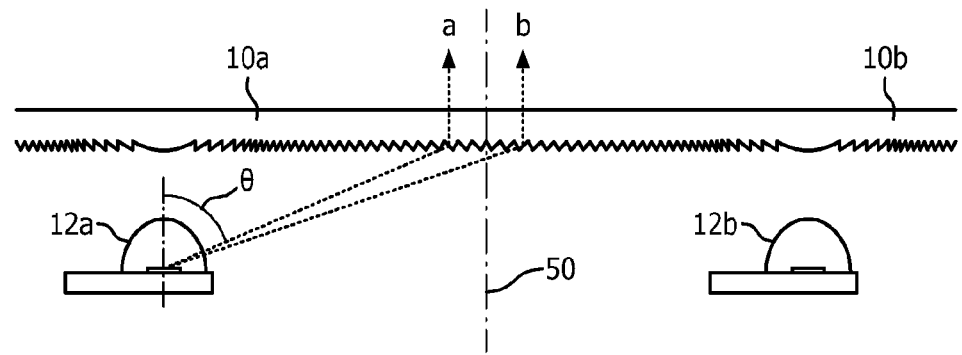
FIG. 5 shows the optical behavior of a first example of system of the invention.

A first embodiment is shown in FIG. 5, which shows two LEDs 12a, 12b forming part of an array of LEDs. Each LED is equipped with an associated thin-film micro-plate/foil as optical element 10a, 10b, and the boundary between them is shown as line 50.

The (thin-film) optical elements are tiled to result in a single sheet of optical elements.

In this first example, the optical elements are modified near the boundary 50 such that the total internal reflection surfaces are symmetrical. With reference to FIG. 1 which shows the first and second surfaces 17,18, these surfaces are arranged with α≈β, namely the same angle with respect to the general plane of the optical plate. This of course also means the surfaces extend at the same angle to the normal direction.

The way light is processed at the boundary area is shown in FIG. 5. A ray originating from an LED that crosses the boundary between two neighboring LEDs (the ray labeled b in FIG. 5) will still be collimated, provided it remains fairly close to the boundary.

Figure 6:
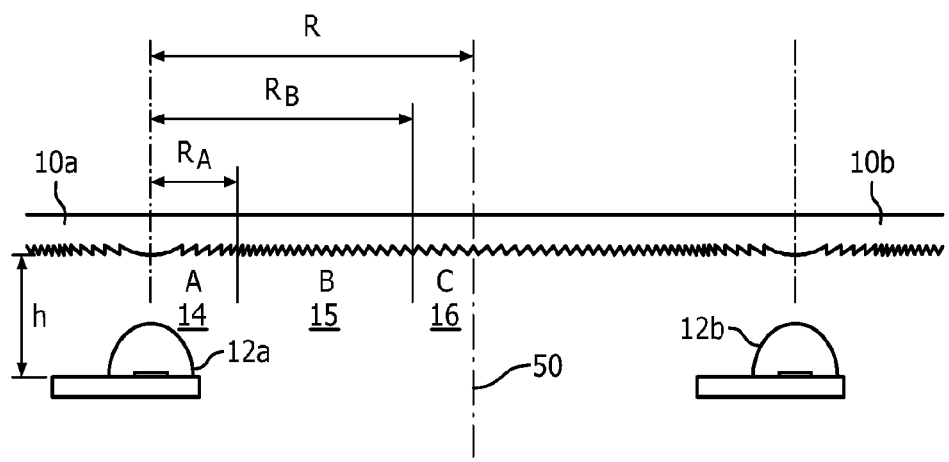
FIG. 6 shows the different regions which make up each beam shaping unit.

As shown in FIG. 6, each optical element 10a, 10b has (at least) three regions.

A first region A,14 has radius $R_A$ in which the light is processed using refraction. This can function as a Fresnel lens.

A second region B,15 is defined between radius $R_A$ and $R_B$, in which rays are collimated based on total internal reflection, with α≠β and α and β optimized such as to result in the highest degree of collimation for the nearest LED in combination with the highest efficiency, i.e. α<85°, β>50°, and |α−β|>5°. Also preferably α>β, with more preferably α−β<30°.

A third region C,16 is defined between radius $R_B$ and R with α≈β. Preferably 50°<α<60° (and 50°<β<60°) and |α−β|<5°. Also, preferably, $60°<\tan^{-1}(R_B/h)<85°$.

A transition from the central area to the intermediate area and from the intermediate area to the outer area occurs respectively at radius $R_A$ and radius $R_B$. $R_A$, $R_B$ and R mutually are related according to $0.15*R \leq R_A \leq 0.4*R$ and $1.5*R_A \leq R_B \leq 0.9R$. This relationship does generally apply, hence not only applies for the embodiment shown in FIG. 6. The outer region thus extends between $R_B$ and R.

Figure 7:
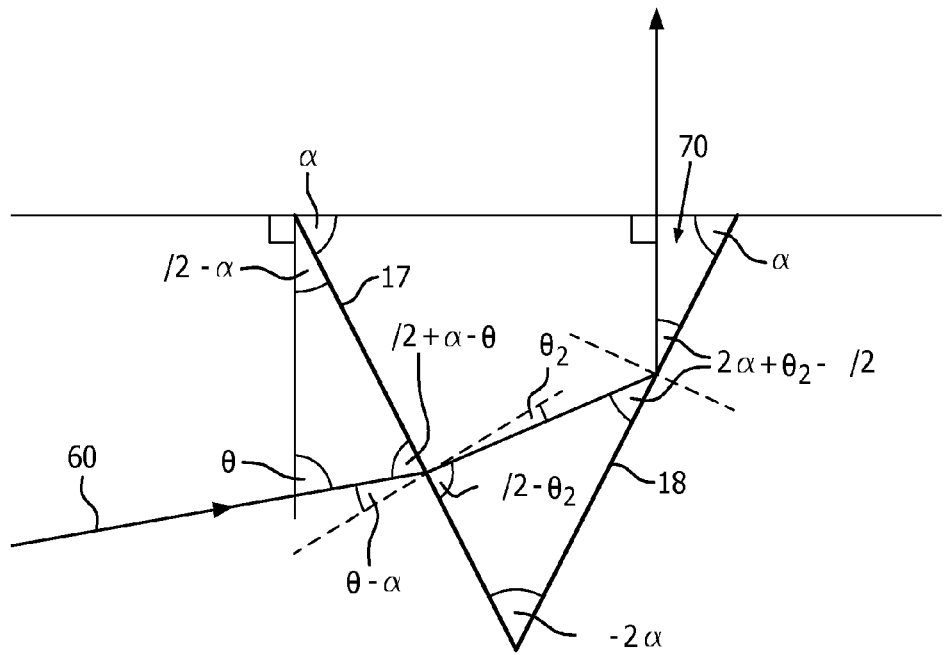
FIG. 7 is used to explain a preferred angular relationship of the beam shaping unit teeth.

FIG. 7 is used to explain these desired relationships and shows an incident beam 60 which leaves the plate in a normal direction. Note that the definitions used allow $\theta_2$ to be negative (on the opposite side of the normal).

For symmetric "teeth" (i.e. α=β), if the following relation is obeyed it is at least then ensured that rays hitting such teeth will be collimated:

$$3\alpha - \pi + \sin^{-1}\left[\frac{\sin(\theta - \alpha)}{n}\right] = 0$$

In this relation, θ is the ray angle of incidence and n is the index of refraction of the material of the optical element.

FIG. 7 shows the angular relationship to provide output light normally to the plane of the optical element. Equation [1] is the refractive index equation, and equation [2] is the summation of the angles of the triangle 70. When combined they give the relationship above.

Figure 8:
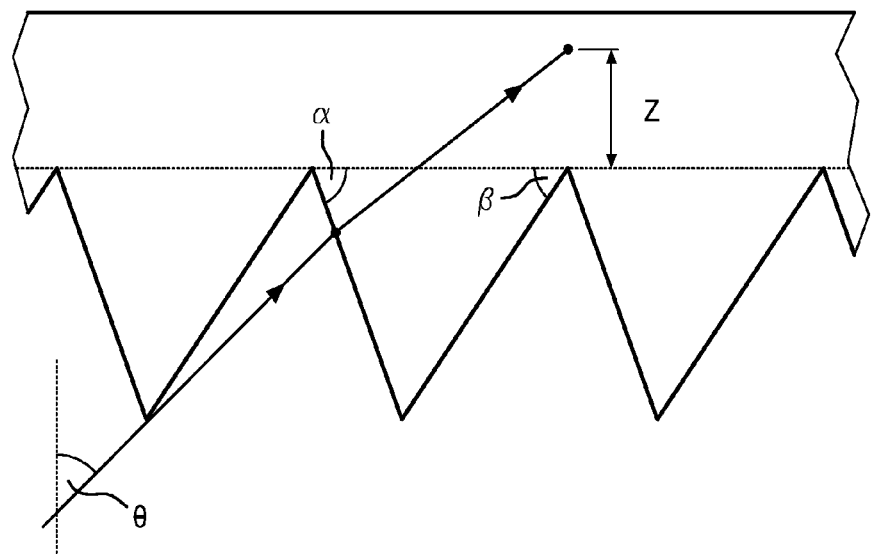
FIG. 8 shows the problem which arises if an incident beam does not meet both faces of the beam shaping unit teeth.

FIG. 8 shows that an incident ray can miss the second surface if the incident angle is too low.

This gives two desired relationships.

Figure 9:
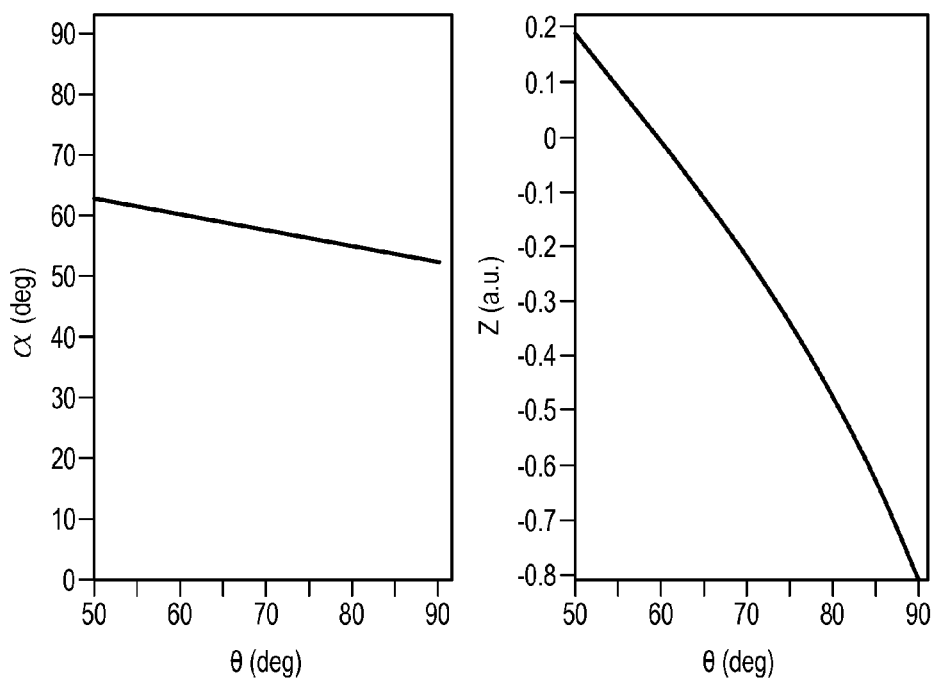
FIG. 9 shows graphs which enable desired angular settings to be selected.

The left plot of FIG. 9 shows the above function as a relationship between α and θ for two refractive index values (1.5 and 1.6). It shows the desired range of values of α (and therefore β) of 50° to 60°. Thus, for typical values of n and large angles of incidence, typically α≈55°±5°. The refractive index is typically in the range 1.4 to 1.7

The right plot in FIG. 9 shows the amount by which a beam misses the second surface (the value Δz in FIG. 8) as a function of the angle θ, again for the same two different refractive index values. For symmetric teeth to be used in collimating rays, the angle of incidence preferably can exceed 60° since for smaller angles a fraction of the rays will miss the second surface.

The advantage of having a third region with symmetrical total internal reflection surfaces is that rays crossing the boundary between two optical elements will still be collimated to a good degree. In effect, the effective radius of each optical element has been increased from R to $R+(R-R_B)$. This will increase the optical efficiency because a larger fraction of the rays will be collimated. It also allows the distance h between the LED and the optical element to be increased and, as a result, reduce the beam spread. In this way, a better trade-off between degree of collimation and efficiency is possible.

Figure 10:
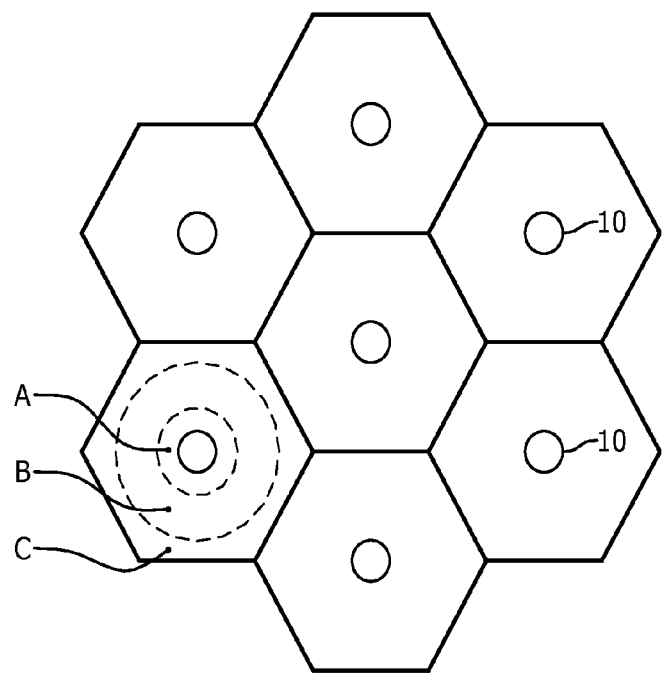
FIG. 10 shows how multiple LEDs and beam shaping units can be formed into a hexagonal grid.

FIG. 10 shows an array of LEDs 10 with an optical plate formed as a set of tessellated hexagons. The three regions A,B,C (or 14, 15, 16) as shown in FIG. 6 are indicated for one of the LEDs.

In a second embodiment, the optical element is again split into three regions as already shown in FIG. 6. However, the reflecting surfaces in the third region (region C) are now asymmetric. The angles α and β of each particular tooth in that region are calculated taking into account the incident rays from the corresponding LED and the neighboring LED simultaneously but without necessarily having equal angles. This is possible due to some freedom in the choice of the angles α and β.

However, to process the light in a similar way from both sides, a same small difference |α−β|<5° is again preferred.

The freedom stems from the fact that a ray interacts with both the first and second optical surfaces of each tooth forming the structure.

Figure 11:
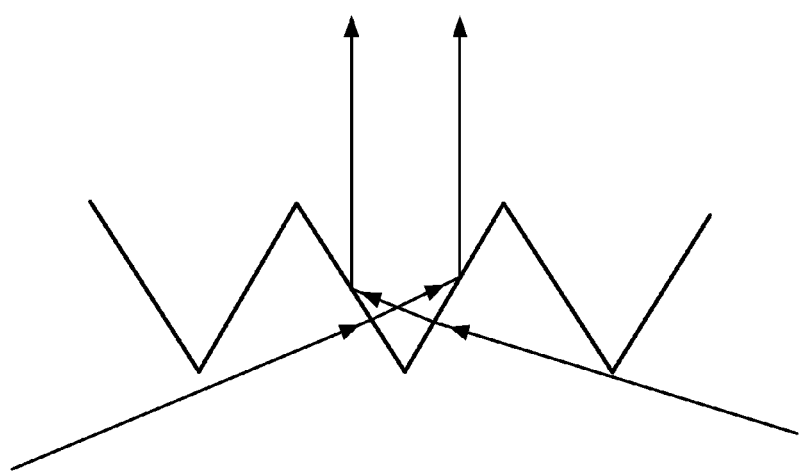
FIG. 11 shows that an asymmetric tooth can be used to process light from LEDs on opposite sides.

FIG. 11 is used to explain the principle of operation of a collimating tooth in the third region performing total internal reflection for both rays incident from both sides. It shows schematically how the refraction followed by reflection results in a normally directed beam for light from opposite sides with slightly different incident angles.

Figure 12:
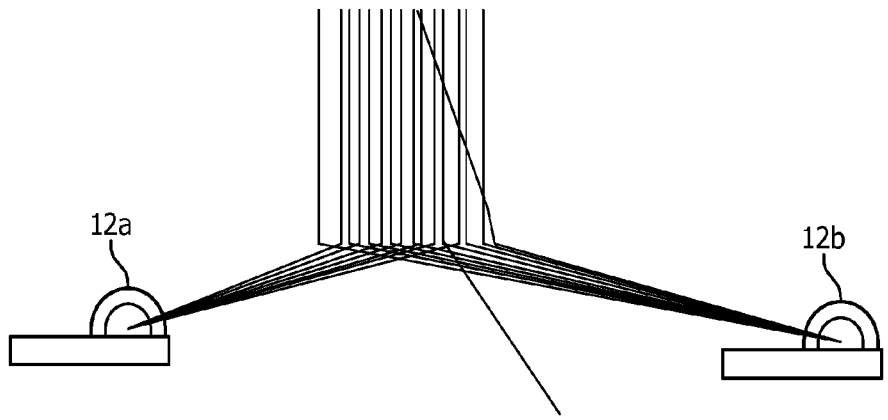
FIG. 12 shows beam traces for asymmetrical teeth between two LEDs.

FIG. 12 shows a ray-tracing simulation showing the rays from two adjacent LEDs collimated by the third region, even though the LEDs are at different distances from the third region, so that the angles of incidence are not the same.

Each tooth of the optical structure can be considered to perform a single TIR function for light from one LED, or a double TIR function for light from two adjacent LEDs. The tooth function depends on the distances to those LEDs and the distance from the LEDs to the optical element.

Figure 13:
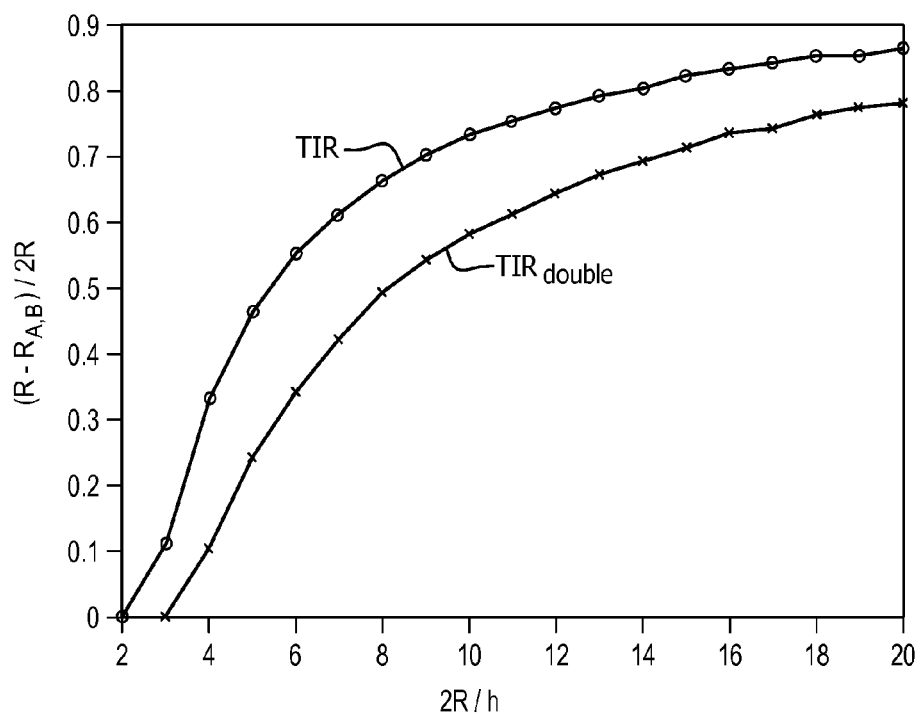
FIG. 13 shows relationships for explaining how large the outer zone of a beam shaping unit can be depending on the spacing between LED and beam shaping unit.

FIG. 13 plots the relative size of the third region $(R-R_B)/2R$, that is, the region of double TIR teeth, as a function of the ratio of the LED pitch 2R to the distance to the optical element h. This is the plot "TIRdouble". The total TIR region $(R-R_A)/2R$ is also shown as plot "TIR".

As in the first embodiment, the advantage of having a double TIR region is that rays crossing the boundary in between two optical elements will still be collimated to a good degree.

In effect, the effective radius of each optical element has again been increased from R to $R+(R-R_B)$.

The cross sections shown for the example above can be linear structures, or else they can be cross sections of a rotationally symmetric structure. However, the concepts can be extended also to rotationally asymmetric structures.

The use of the outer (third) region to process light from both sides requires them to have limited asymmetry, so that the difference between α and β of less than 5 degrees applies, as well as the preferred range of α and β each to be between 50 and 60 degrees. At the boundary between two LEDs, symmetric teeth are preferred (α=β). Gradually, further away from the boundary, there is more freedom to choose α and β and to obtain comparable results. Thus, the degree of asymmetry may vary at different distances from the boundary.

Figure 14:
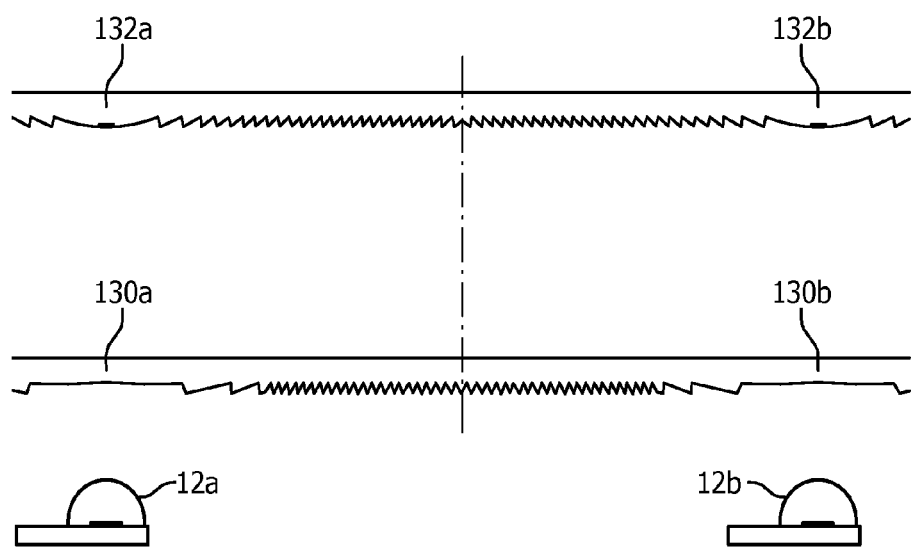
FIG. 14 shows a second example of a system of the invention.

A third embodiment is described with reference to FIG. 14.

In this embodiment, the configuration consists of an array of LEDs 12a, 12b, with each LED now having a stack of two optical elements 130a, 132a for one LED 12a and 130b, 132b for the other LED 12b. The optical element 130a, 130b closest to the LED collects the rays emitted by the LED and in a uniform manner illuminates the second optical element 132a, 132b.

The second optical element provides beam shaping (for example collimation into a narrow spot). Also in this case, the first optical element 130a, 130b is divided into three distinct regions in the manner explained above.

The central area of the lower optical elements 130a, 130b provides only a partial beams shaping by refraction, since this beam shaping can be completed by the second optical element 132a, 132b.

As in the examples above, the micro-structures do not necessarily need to be rotationally symmetric.

The examples above have been explained generally to be designed for the collimation of light. However, other more complex beam shaping is also possible using similar optical elements.

The examples above make use of LEDs. However, the beam shaping can be applied to other small area light sources. Generally, the invention is of particular interest for solid state lighting devices.

The system is generally of interest for light sources with a small light output area. Typically, LED die sizes (parameter s in FIG. 3) range from 0.1 mm to 2 mm.

The spacing between LEDs (radius R in FIG. 2) is typically in the range 5 mm<R<25 mm, for example 10 mm to 15 mm. The spacing value (parameter h in FIG. 3) is typically in the range 1 mm<h<10 mm, for example 1.5 mm to 2.5 mm. In general for all embodiments, preferably the R/h has a ratio in the range of 4<=R/h<=10.

Suitable materials for the optical plate are plastics such as PMMA and polycarbonate. These are the materials most often used in optical components for lighting applications.

The invention can be applied to, among others, lighting applications requiring a beam with limited angular spread such as spots, downlighters, and luminaires for office lighting.

The examples above make use of discrete physical light sources underneath each beam shaping unit. However these light sources may be sources of light routed from a remote physical light source, for example by mirrors or light guides.

Thus, the light sources may be virtual, with the actual original source of the light at a different location. The term "a light source" should be understood accordingly. In this case, a shared physical light source may provide a plurality of the virtual light sources, for example as an LED with a set of mirrors around the LED to create the array of virtual light sources.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A beam shaping system comprising an array of beam shaping units arranged in a general plane, each beam shaping unit comprising:
    a central area for providing a beam passing function by refracting light from a light source beneath the central area;
    an intermediate area for providing a beam shaping function via total internal reflection of light from the light source beneath the central area;
    an outer area for providing a beam shaping function via total internal reflection of light from the light source beneath the central area and also providing total internal reflection of light from a light source beneath the central area of an adjacent beam shaping unit, and
    each beam shaping unit having a contoured surface for facing an array of light sources, wherein the contoured surface in the intermediate area and the outer area comprises a set of light deflecting prismatic elements, each having a first face for facing towards the light source and a second face for facing away from the light source,
    wherein the first face extends from the general plane at a first angle $\alpha$ and the second face extends from the general plane at a second angle $\beta$,
    wherein for the set of light deflecting prismatic elements in the intermediate area $\alpha<85°$, $\beta>50°$, $|\alpha-\beta|>5°$,
    wherein for the set of light deflecting prismatic elements in the outer area $50°<\alpha$, $\beta<60°$ and $|\alpha-\beta|<5°$.

2. A system as claimed in claim 1, wherein the system comprises a plate or a foil on which the beam shaping units are arranged.

3. A system as claimed in claim 1, wherein for the outer area $\alpha=\beta$.

4. A system as claimed in claim 1, wherein for the intermediate area $\alpha>\beta$, preferably $\alpha-\beta<30°$.

5. A system as claimed in claim 1, wherein the central area comprises a set of said light deflecting prismatic elements, wherein for the central area $\alpha>80°$ and $\beta<50°$, preferably $\alpha-\beta>35°$.

6. A system as claimed in claim 5, wherein the material of the plate or foil has a refractive index in the range 1.4 to 1.7.

7. A system as claimed in claim 1, wherein the deflecting prismatic elements are ridges, preferably these ridges are arranged as concentric circles.

8. A system as claimed in claim 1, wherein each beam shaping unit has a hexagonal outer shape, the boundary between the central area and the intermediate area is circular, hexagonal or hexagonal with rounded corners, and the boundary between the intermediate area and the outer area is circular, hexagonal or hexagonal with rounded corners.

9. A system as claimed in claim 1, wherein the beam shaping function of the intermediate area and of the outer area is a collimation function.

10. A system as claimed in claim 1, wherein the beam passing function provided by the central area is a collimation function.

11. A system as claimed in claim 10, wherein the central area comprises a Fresnel lens.

12. A system as claimed in claim 1, comprising a second array of second beam shaping units arranged in a general plane over said array of beam shaping units, wherein the beam passing function provided by the central area of said array of beam shaping units provides a pass through function.

13. An illumination system, comprising:
    an array of light sources; and
    a beam shaping system as claimed in claim 1, wherein the central area of each beam shaping unit is provided over a respective light source.

14. An illumination system as claimed in claim 13, wherein the light sources comprise LEDs.

15. An illumination system as claimed in claim 13, comprising a spot light illumination system.

* * * * *